United States Patent [19]

Isozaki et al.

[11] Patent Number: 4,807,070
[45] Date of Patent: Feb. 21, 1989

[54] SUPPORTING STRUCTURE FOR DUAL MAGNETIC HEAD

[75] Inventors: Shin Isozaki, Kamakura; Michio Yagi, Hachioji, both of Japan

[73] Assignee: Konishiroku Photo Industries Co., Ltd., Tokyo, Japan

[21] Appl. No.: 71,418

[22] Filed: Jul. 9, 1987

[30] Foreign Application Priority Data

Jul. 11, 1986 [JP]  Japan ................. 61-163267

[51] Int. Cl.$^4$ .............................. G11B 5/48
[52] U.S. Cl. ..................... 360/104; 360/105
[58] Field of Search ........... 360/102, 103, 104, 105, 360/129, 97, 99

[56] References Cited

U.S. PATENT DOCUMENTS

| | | | |
|---|---|---|---|
| 4,291,350 | 9/1981 | King et al. ................... | 360/104 |
| 4,306,260 | 12/1981 | Maeda et al. ............... | 360/104 X |
| 4,363,045 | 12/1982 | Herman ...................... | 360/103 X |
| 4,646,181 | 2/1987 | Morigaki .................... | 360/104 |
| 4,651,245 | 3/1987 | Kanno ........................ | 360/105 |
| 4,724,500 | 2/1988 | Dalziel ....................... | 360/104 X |

FOREIGN PATENT DOCUMENTS

| | | | |
|---|---|---|---|
| 0253678 | 1/1986 | Japan ......................... | 360/104 |
| 0748502 | 7/1980 | U.S.S.R. ..................... | 360/103 |

*Primary Examiner*—Robert S. Tupper
*Assistant Examiner*—Andrew L. Sniezek
*Attorney, Agent, or Firm*—Thomas E. Schatzel

[57] ABSTRACT

The present invention relates to a mechanism for carrying a pair of magnetic core heads for reading and writing magnetic codes on a flexible disk having magnetic coatings thereon while the disk is rotating. Each of the heads is disposed on either side of the disk. The head carrying mechanism allows one of the heads 1 to rock about a radial axis with respect to the disk, i.e. pitching and to rock about a circumferential axis with respect to the disk, i.e. rolling as well as to move in the direction normal to the disk face. Further, the head carrying mechanism allows the head 0 to pitch about a radial axis with respect to the disk face but not to roll about an axis parallel to the circumferential direction with respect to the disk.

8 Claims, 9 Drawing Sheets

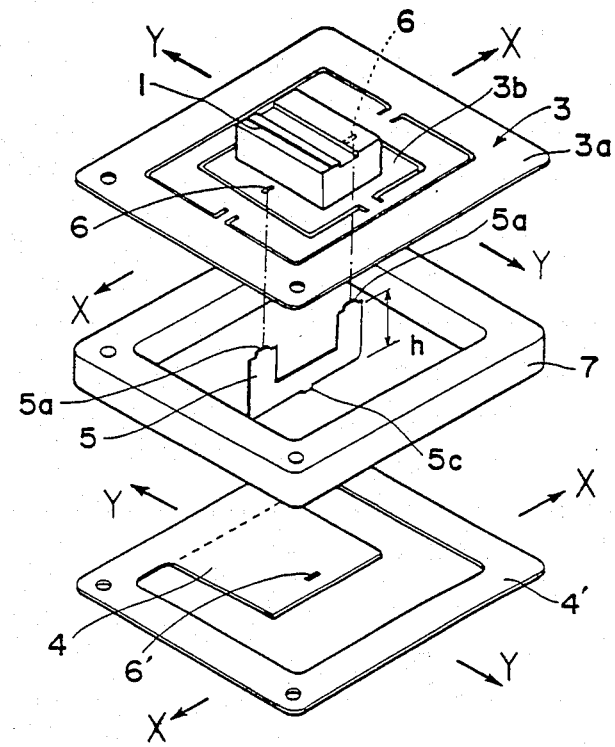
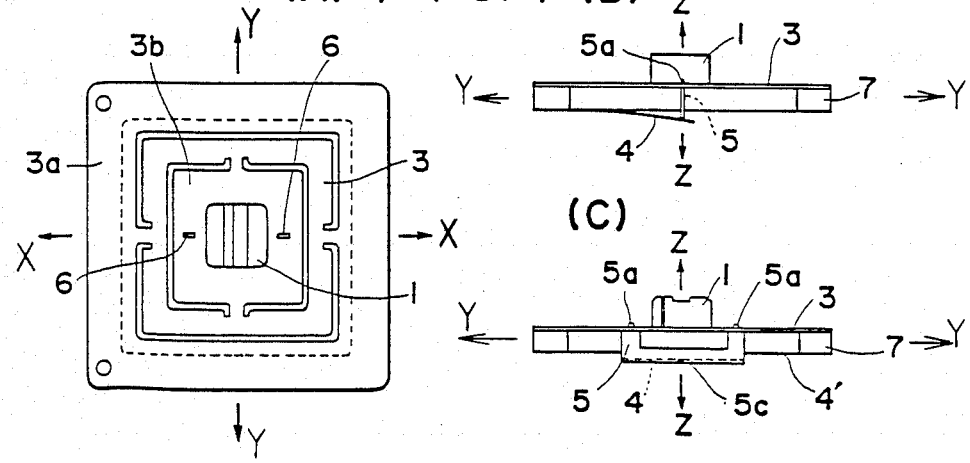

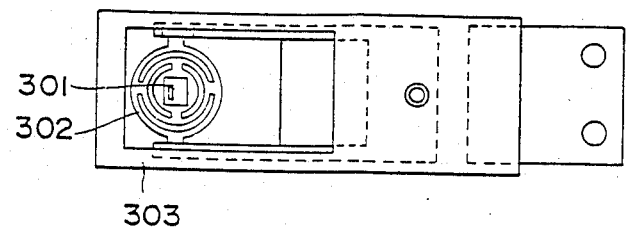
FIG. 18 (PRIOR ART)
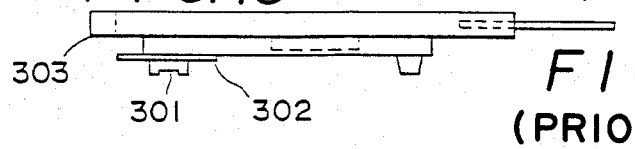
FIG. 19 (PRIOR ART)
FIG. 20 (PRIOR ART)
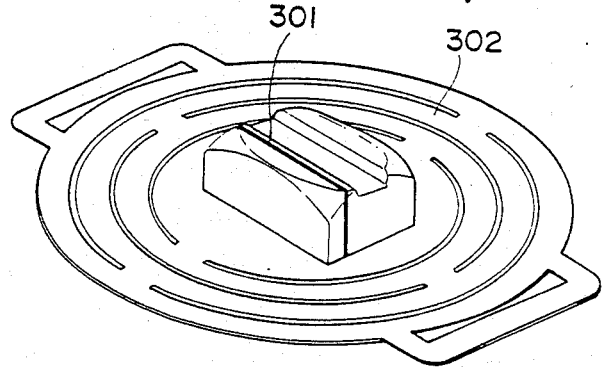
FIG. 22 (PRIOR ART)
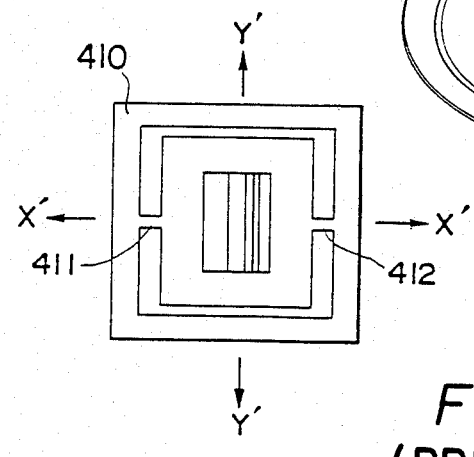
FIG. 21 (PRIOR ART)
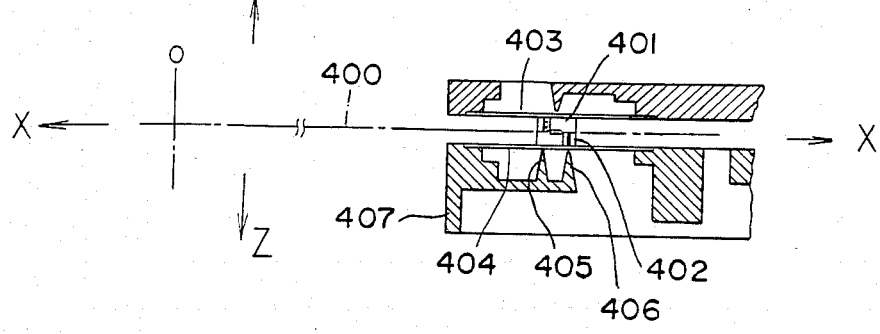

SUPPORTING STRUCTURE FOR DUAL MAGNETIC HEAD

BACKGROUND OF THE INVENTION

1. Field of the Invention

The invention relates to a head-carrying mechanism for disk driving apparatus for double-side flexible disks, and more specifically to a support for a pair of heads which is utilized for reading and writing data on a flexible disk as is used in computers or word processors.

2. Description of the Prior Art

Several types of head carrying mechanisms have been in use, and efforts have been made to realize a mechanism which allows the head to follow faithfully the surface of the flexible disk while it rotates.

A typical prior art will be described hereinafter with reference to the drawings.

In the Specification of U.S. Pat. No. 4,089,029, a head carrier for the 0-side of a flexible disk (hereinafter cited as media) as well as a head carrier for the side-1 of the media is described. The FIGS. 9 to 14 show an example of aforementioned prior art. FIGS. 9 and 10 show a head carrying mechanism for 1-side surface of the media and FIGS. 11, 12, one for 0-side surface of the media respectively. The head carrying mechanism for side-0 surface and that for side-1 surface has the same structure except for the location of the head core 121 and pressure loading arm 125. The side 1 head 102 is held by a cantilever gimbal spring 103. The side 0 head 122 is held by a similar gimbal spring 123. Both heads 102, 122 have at their rear face projections 104, 124, which abut on the spring 105, 125. The gimbal 103, the projection 104, and the spring 105 form an unseparable part. Similarly, the gimbal 123, projection 124, and the spring 125 form another part as seen in FIG. 13. the gimbal 103 for the side 1 face, and the gimbal 123 for the side 0 face, is fixed on the members 107 and 127 respectively, which are fixed to the bottom of the arms 106 and 126 on either side of the media 100. To provide magnetic recording or reading, the heads 102, 122 are moved into contact with the rotating media surfaces.

The head carrying mechanism of the prior art shown in FIG. 13 has cantilever gimbals 103, 123, which are very flexible, and are capable of following a slight wobbling motion, radial or circumferential distortion of the media. The head is also capable of smaller head load force, i.e. force of contact of the head to a media surface.

However the head of the prior art has the drawback that good recording contact of the head can be easily damaged due to the wobbling of the head in case of excessive distortion or warp of the media, or inaccuracy of positioning of the media. In other words, the cantilever gimbal springs 103, 123, which carry the heads 102, 122 form cantilevers with one of their ends fixed to the arms 106, 126.

Another drawback is that when the cantilever springs carrying the heads 102, 122 are bent, and the heads 102, 122 are inclined to the media surfaces, the head cores 101, 121 are slightly radially displaced thereby causing hazardous effect on tracking accuracy.

The head carrying mechanism of the prior art has another drawback that complicates shape of the cantilever springs 103, 123 and require loading springs to have severe dimensional tolerances. The gimbal springs 103, 123 when they are removed from the assembly, show a spring back as shown in broken lines in FIGS. 9, 11 to give a pre-load to the head carrier when it is assembled. This spring back of the gimbal spring causes difficulty in keeping the head in a correct position when it is assembled into a head carrying mechanism.

FIGS. 15-17 show another prior art as disclosed in U.S. Pat. No. 4,151,573. A carriage 201 is provided on the side 0 face of a media 200. The carriage is movable in the radial direction with respect to the media. On the carriage 201 is fixed a button-shaped head 202. The head is in contact with the side 0 surface of the media. On the side 1 surface of the media is disposed a head 205 which is movable with respect to the media. The head 205 is fixed on a cantilever gimbal 204, which is held on an arm 203. One end of the arm 203 is hinged to the stem of the carriage 201. The head 205 has at its back a projection 206 which receives a loading force of a pivot 207 fixed on the arm 203. A coil spring 208 is provided on the stem of the arm to urge the pivot downward, or to the button-shaped head 202. The button-shaped head 202 for side 0 surface has a flat contact surface with its periphery chamfered. The contact surface of the head 202 is placed slightly above the level of the media surface to penetrate the media.

The head carrying mechanism of the last mentioned prior art has found a wide use because the head of this type has many advantages e.g. simplicity in structure, high reliability of tracking notwithstanding wobblings of the media due to the fact that the head is fixed directly on the carriage and no displacement of the head occurs.

However in order to yield the media to assure a good recording contact between the head and media surface, a comparatively high loading pressure is required, in particular when the media has undulations. To prevent excessive wear of the media, allowable loading pressure is limited. When the media has excessive undulations, a slight gap may occur between the head and the media surface, even if the greatest allowable loading pressure is applied on the head. Furthermore, when the accuracy of the position of the head with respect to the media surface is not sufficient, a gap can easily occur between the side 0 surface and the head which moves to the side 0 surface of the media because the tolerance in height of the head over the media surface is very tight. If the gap exceeds 0.2–0.3 $\mu$m for a media having an ordinary recording density, recording or reading of data is impossible. The gap must be tighter for higher recording density. For this reason, this type of head carrying mechanism is not suitable for high density recording.

The head of this type has still other drawbacks that the side 1 head 205 receives a relatively great mass of the arm 203, and tends to damage the media when the head is moved to the media surface too rapidly, or contact pressure on the media surface is liable to change by the posture of the carriage.

FIGS. 18-20 show still another prior art as is shown in Japanese Utility Model Publication No. 61-34596 (U.S. Pat. No. 4,306,258). In the publication, a head is disposed on each side of the media. The head carrier of each side is similar in construction. The head is fixed on the center of the planar spring gimbal 302. The contact pressure is obtained by the spring back of the gimbal 302. The head carrying mechanism prevents dislocation of the head as long as no deformation occurs on the head carrying arm 303. The head carrying mechanism assures a good recording contact of the head due to the spring rate of the gimbal in the direction normal to the media face, and provides capability to the head of swing movement about the axis both circumferentially and radially with respect to the media.

However, the head carrying mechanism allows a radial dislocation of the head core gap as a result of swing motion about an axis parallel to the direction of the motion of the media. The dislocation of the head core gap occurs because the head slider, which is more than 2 mm in height, is tilted about the gimbal. The height of the head slider must be at least 2 mm to allow movement within the jacket of the media. The abovementioned radial wobbling of the head core causes a dislocation of the head, i.e. off-tracking. As a result, severe allowance is posed on the track margin and this allowance is especially severe when a high density recording is employed in which a number of tracks per inch or per mm is very large. In a disk driving apparatus for a high density recording disk in which a servo tracking technology is employed, follow up control of too rapid off-tracking, i.e. high frequency of off-tracking, is impossible.

FIGS. 21-22 show the fourth example of prior art as shown in Japanese Patent Publication No. 58-43828, in which the heads 401, 402 are fixed at the center of gimbals 403, 404. One of the gimbals 404 is supported by radially spaced members at 404, 405.

The heads 401, 402 are supported on a carriage which is pivotable about an axis parallel to a radius of the media so that good circumferential follow-up of the heads can be achieved. In other words, the head is allowed to rock about a radial axis with respect to the media (pitching).

This type of head carrying mechanism allows for only a swing motion of the heads around an axis parallel to a radius of the media, and no swing motion around an axis parallel to the circumferential to the media nor wobbling to the direction normal to the media, is allowed. This means a gap can occur, when the relative height changes, between the head core and the media. When the supports 405, 406 are fixed on a carriage 407 with resilient members therebetween, the head is allowed to rock in the Z-X plane (rolling), which is undesirable.

FIG. 22 shows another type of gimbal which realizes similar functions as that shown in FIG. 21. The gimbal has a pair of bridges 411, 412, which allow the head to pitch. However, the gimbal does not allow the head to roll nor to move normal to the media face.

SUMMARY OF THE INVENTION

The present invention is proposed to overcome the drawbacks of the above mentioned four examples, while keeping the advantages thereof.

It is an object of the invention to provide a head carrying mechanism which allows for sufficient follow-up characteristics of the head, while preventing off-tracking thereof.

It is another object of the invention to provide a head carrying mechanism for a high recording density head, i.e. high circumferential density (BPI) as well as high radial density (TPI) recording head.

It is still another object of the invention to provide a head carrying mechanism having a simple structure.

BRIEF DESCRIPTION OF THE DRAWINGS

FIG. 3 is an exploded view of another embodiment of side 0 head carrying mechanism.
FIG. 4A is a plan view of the head carrying mechanism shown in FIG. 3.
FIG. 4B is a cross-section of the apparatus taken on line Y—Y of FIG. 4A.
FIG. 4C is a cross-section of the apparatus taken on line X—X of FIG. 4A.
FIGS. 9-22 show examples of prior art.

PREFERRED EMBODIMENT

Figure 1:
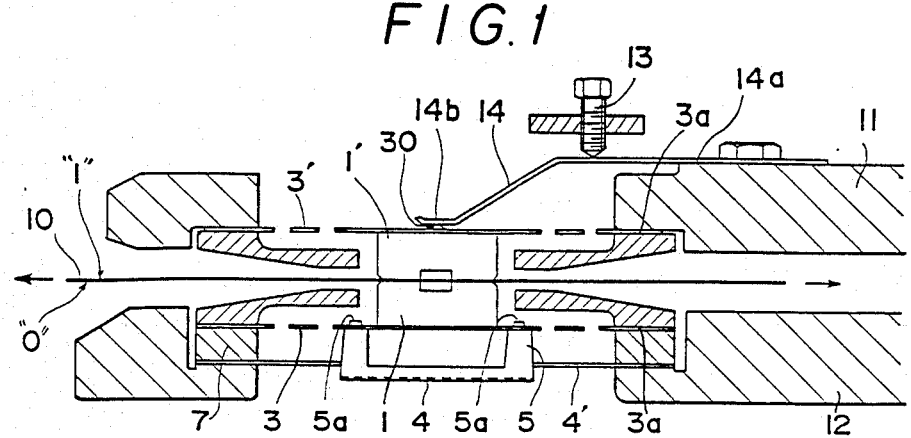
FIG. 1 is a sectional view of the carriage.
Figure 2:
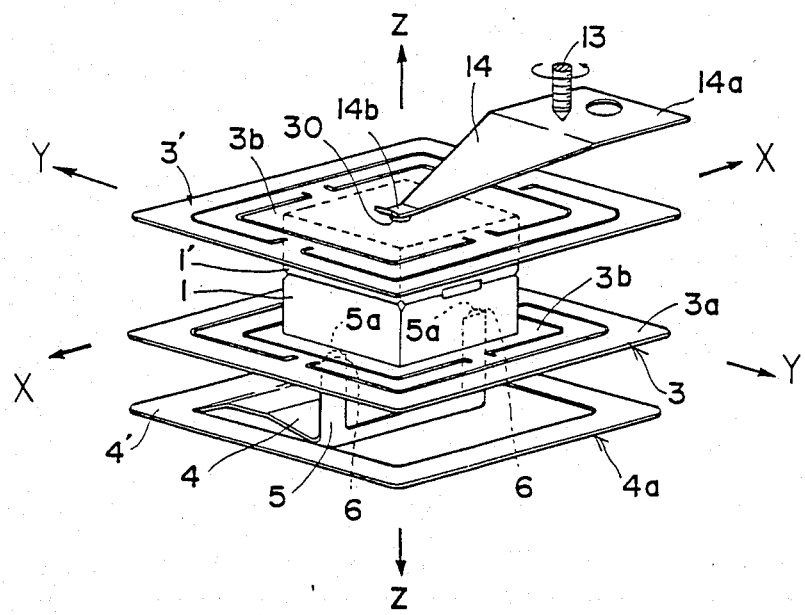
FIG. 2 is an isometric view of the carriage.

Preferred embodiment of the present invention will now be described with reference to FIGS. 1-8. FIG. 1 is a sectional view of a carrying mechanism according to the present invention. FIG. 2 is an isometric view of the carrying mechanism. The carriage has a pair of heads 1, 1' which will be described hereinafter. The carriage is slidable along guide bars in the direction normal to the surface of a flexible disk (which will be referred to as media 10).

In the figures, each of the heads 1, 1' has a read/write core for reading or writing codes magnetically on the media. The heads 1, 1' are fixed on a respective supporting member 3, 3'. The member 3 is fixed on a lower arm 12 at its peripheral portion. Similarly, the member 3' is fixed on an upper arm 11. The central portion 3b of the members 3, 3' is capable of pitching (about the X—X axis) and rolling (about the Y—Y axis), wherein X—X axis and Y—Y axis run radially and circumferentially with respect to the media respectively. Furthermore, the central portion 3b is movable in the Z—Z direction. Thus the members 3, 3' function as gimbals. The head 1 is fixed on the central portion 3b of the gimbal 3 for recording contact with side 0 surface of the media. The central portion 3b of the gimbal spring for the surface "0" is supported at its back by a pair of vertical legs 5, 5 of a cantilever spring 4 which spring can be manufactured by cutting off or etching process. Thus the head is secured against rolling. The cantilever spring 4 has a horizontal extension disposed parallel to the Y—Y axis and the pair of legs 5 extending normal to the X—Y plane which act as a spacer for the head. The bifurcated spacer 5 is secured on the gimbal 3 normal thereto at projections 5a, 5a of legs 5, 5 (more than two joints may be used).

The height (h) of the spacer measures 2-3 mm. At the end of the legs 5, 5 is formed the projections 5a having tapered sides, which are inserted into apertures 6, 6. Thus legs 5, 5 and apertures 6, 6 are coupled together preventing any loose motion in the Y—Y direction. As the coupling joint allows relative rotation around the axis X—X, the angle between the gimbal and the spacer can change. The change in the angle is possible when the cantilever spring 4 is made with a thin plate.

Because the joints between the gimbal and spacer allow no sliding motion thereof, vibrations can occur in the gimbals 3, 3', which secure the heads 1, 1' when the media moves in contact with the head. In this case damping material having high viscosity may be applied onto the joints. Thus pitching vibration is dampened.

Although in the embodiment shown in FIG. 2, the spacer 5 is shown as having a tongue 4 bent upwardly, which is made with a resilient material, the structure of the spacer is not limited to the embodiment.

FIGS. 3 and 4 show another example of spacer. In the figures, a cantilever leaf spring 4 and a spacer 5 are made as separate parts. On the lower side of the spacer 5 is formed a projection 5c, which is inserted in a slot extending in Y direction thereby forming a non-slidable joint.

In assembling the head carrying mechanism, the gimbal 3, cantilever spring 4 and the spacer 5 are assembled into a unit in the first step and the unit is then set on the arm 12.

Figure 5:
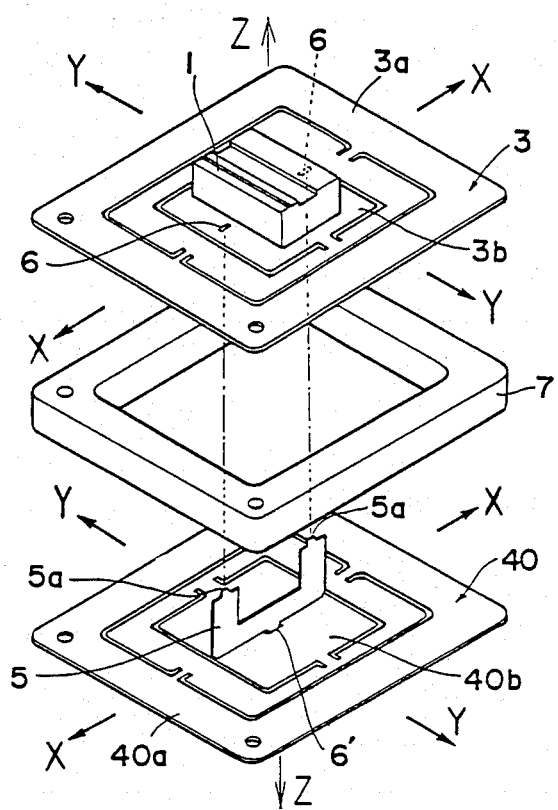
FIG. 5 is an isometric view of side 0 head carrying mechanism of the other embodiment.
Figure 6:
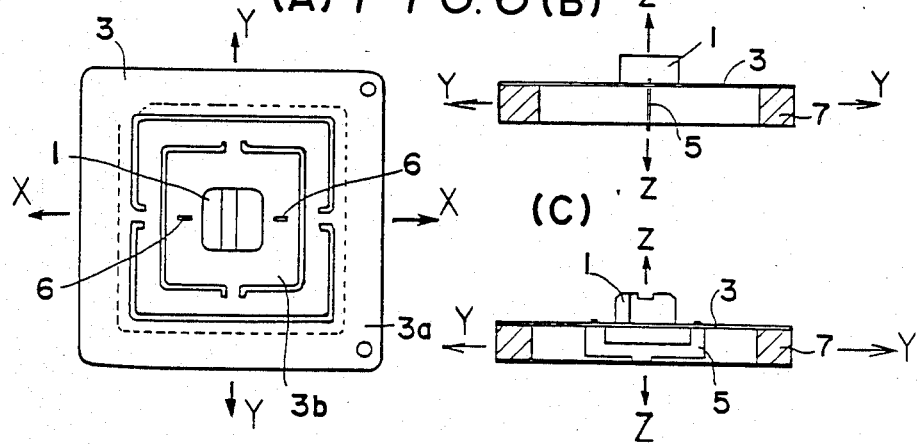
FIG. 6A is a plan view of the head carrying mechanism of FIG. 5.
FIG. 6B is a sectional view taken on line Y—Y of FIG. 5.
FIG. 6C is a sectional view taken on line X—X of FIG. 6A.

FIGS. 5 and 6 show still another embodiment of a head carrying gimbal for side 0 head. In the embodiment, a third gimbal spring 40 similar to the gimbal 3 is disposed under the gimbal 3, with spaced relation by means of a spacer 5, preventing rolling motion. The gimbal 40 which is spaced from the head carrying gimbal 3, and parallel thereto is secured at its periphery 40a. The central part 40b is movable in the Z direction, is capable of pitching, but not of rolling (rocking about Y—Y axis).

The head carrying mechanism, with two gimbals 3, 40, each being connected by means of the spacer 5, does not permit the head 1 to rock in the X-Z plane, but permits the head 1 to rock in Y—Z plane and to move in the Z—Z direction.

As can be seen in FIG. 1, the gimbal 3' carrying the head 1' for side 1 surface has at its upper side a projection. Through the projection 30, the biasing force of the spring 14 is exerted on the head 1'. The spring 14 is secured at its other end 14a on the upper arm 11 by means of screws or other known means. This construction permits the side 1 head to move in relation to the arm 11 in the Z—Z direction. An adjustment screw 13 is used to adjust the biasing force of the spring 14. In the above embodiments, the displacement of the top of the spacer 5, which will be denoted as x, if the head is inclined to the media surface in the Z-X plane, is given by the following formula:

$$x = h \cdot \tan\theta$$

wherein
$\theta$ is the angle of inclination of head; and
h is the height of the spacer.
The displacement appears in X—X direction.

The leaf spring 4 extends in the Y—Y direction, and has a sufficient width in X—X direction to resist to a X—X deflection. Hence, the spacer 5 which is jointed to the spring 4, will not deflect in X—X direction thus preventing rocking motion of the gimbal in the Z-X plane. As the cantilever spring 4 as well as the gimbal 3 is yieldable in Z direction, the head carrying mechanism assures a good follow up characteristic of the head even in case of wobbling of the media or misalignment of the media due to machining tolerances in the dimension, while keeping rigidity against rolling.

Furthermore, the head carrying mechanism assures good lengthwise follow-up of the head because the spacer 5 is joined to the gimbal 3 at plurality of points disposed in X—X direction which permit pitching of the head.

Although in the last-mentioned embodiment, the gimbals 3, 3' carrying the heads 1, 1' are described as two-axis square spring gimbals, other types of gimbals may be used, for example round spring gimbal or a cantilever gimbal as will be described below.

Figure 7:
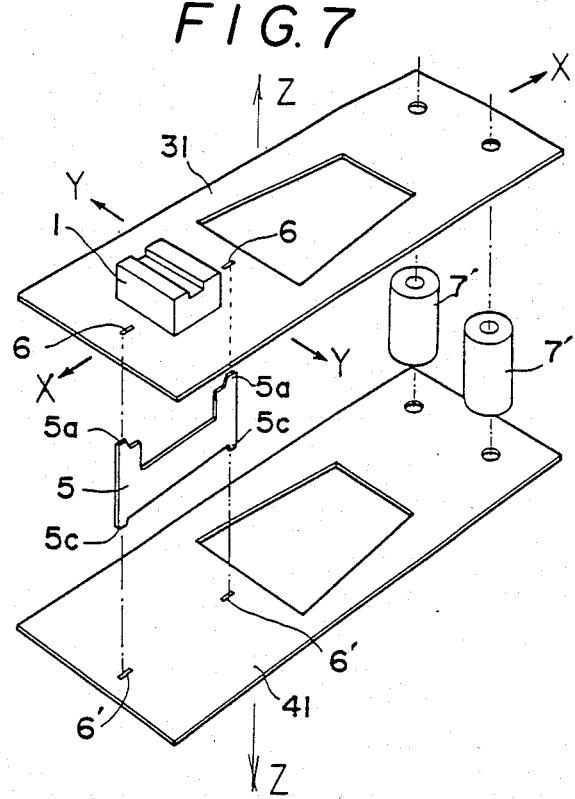
FIG. 7 shows still another embodiment exploded.
Figure 8:
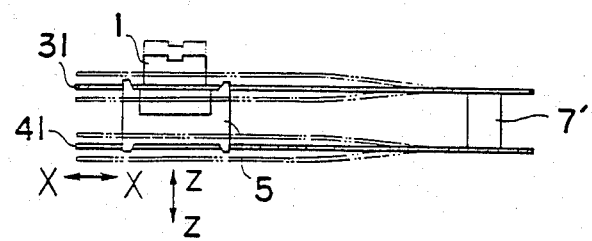
FIG. 8 is a sectional view of the apparatus shown in FIG. 7.
Figure 9:
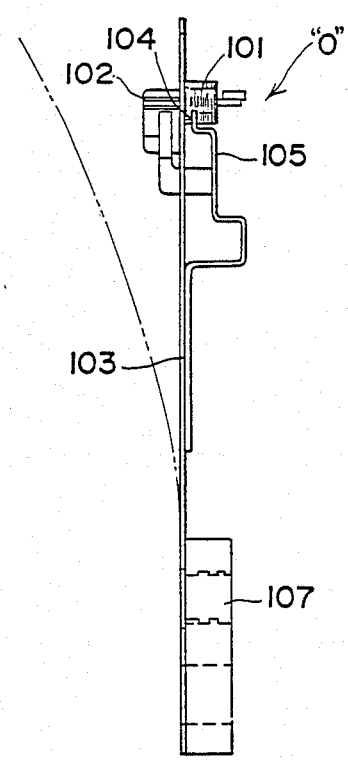
Figure 10:
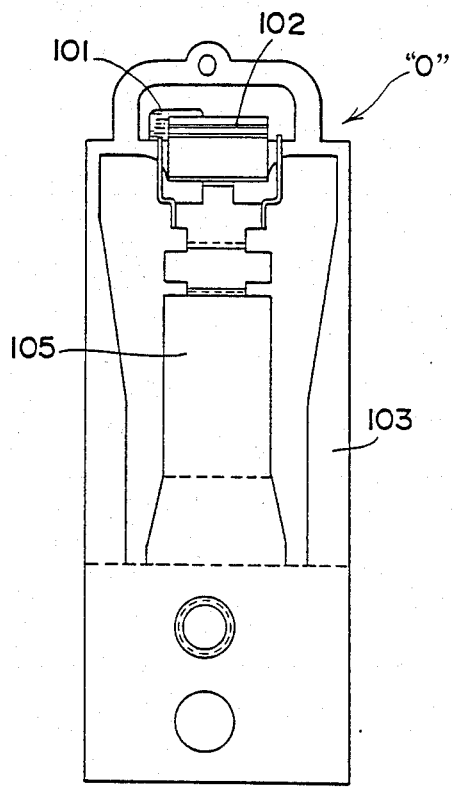
Figure 11:
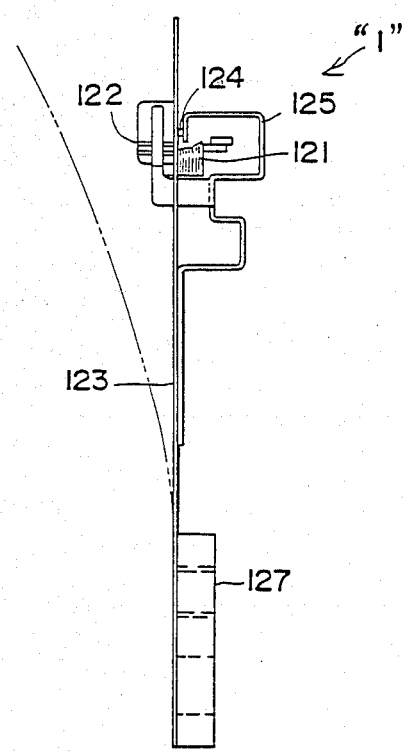
Figure 12:
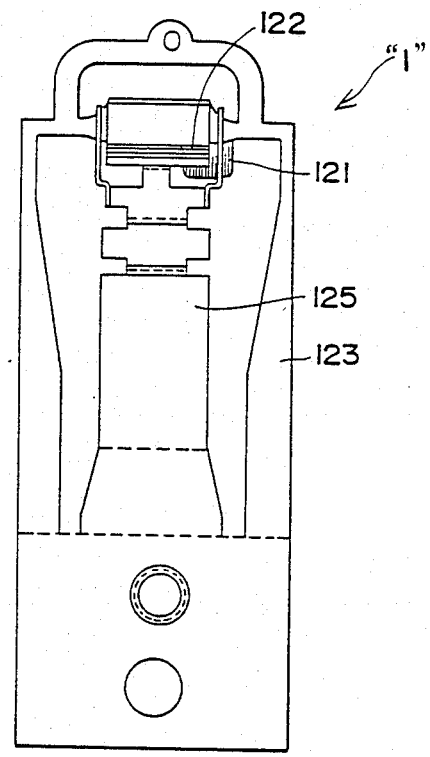
Figure 13:
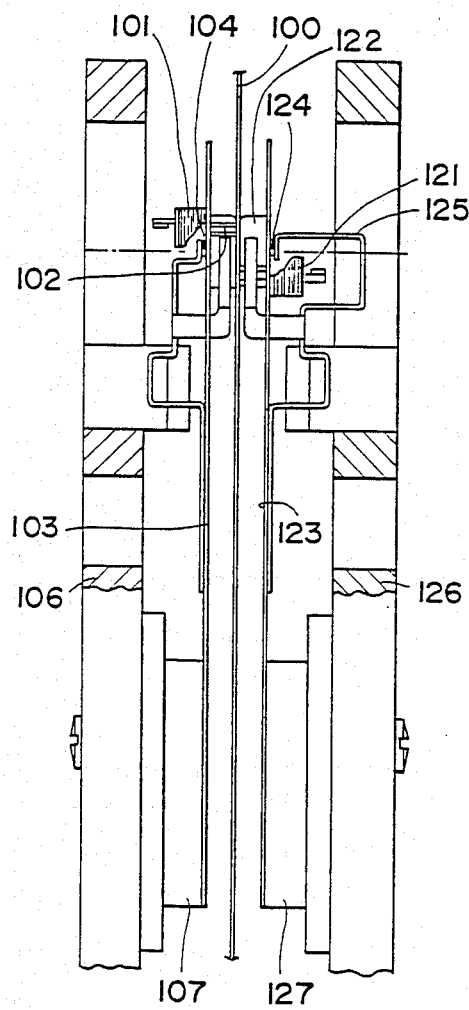
Figure 14:
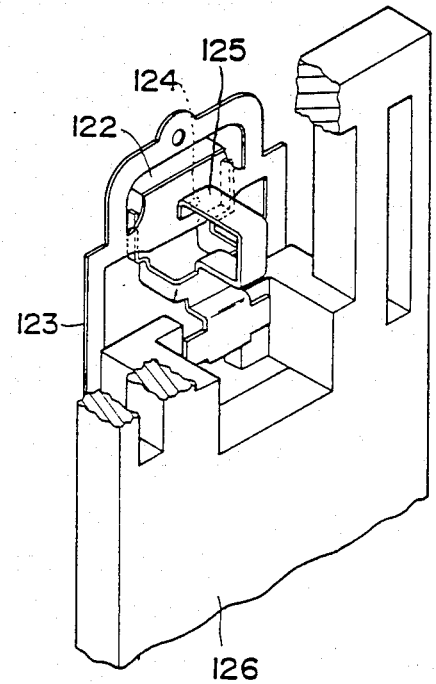
Figure 15:
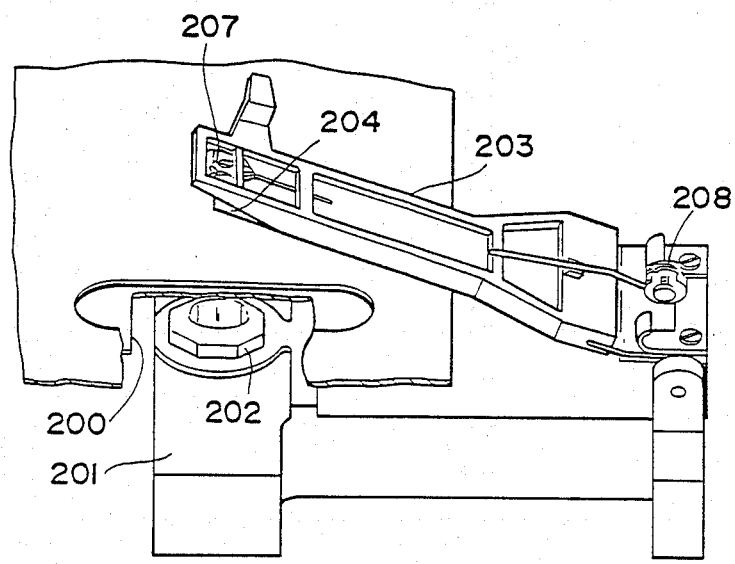
Figure 16:
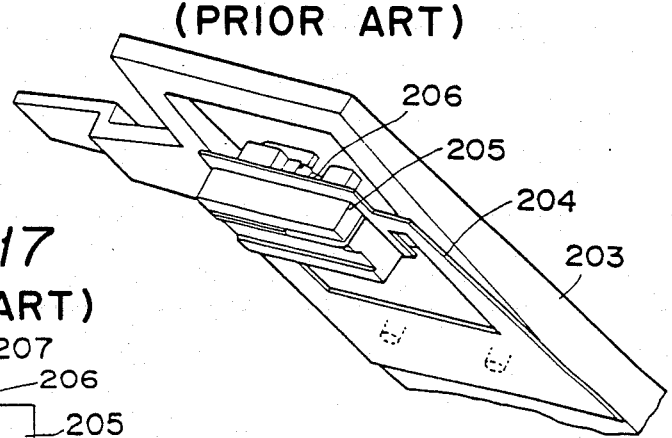
Figure 17:
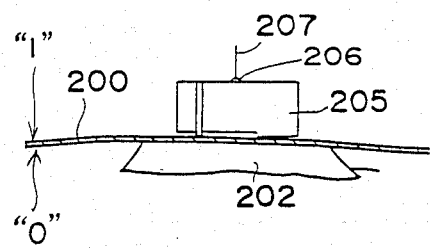

FIGS. 7-8 show another embodiment of the present invention, in which a cantilever gimbal 31 is employed. This type of gimbal has the drawback that it may rotate.

As shown in the figures, the head 1 is fixed on a cantilever leaf spring gimbal 31. Another cantilever spring 41 is disposed parallel to the gimbal 31 with a support member 7' therebetween. The other end of each leaf spring is joined with a spacer 5 thereby preventing rolling of the head. The spacer has a pair of projections 5a, 5a on the upper side, and each of these projections is inserted into either of two or more slots 6, 6, provided in radially spaced relation on the cantilever leaf spring gimbal 31. On the bottom side of the spacer 5 are provided a pair of projections 5c, 5c, and each of these projections is inserted into either of the slots 6', 6' provided on a leaf spring 41. With this head carrying structure, the head 1 is prevented from translational motion in the Z-X plane because a pair of cantilever leaf springs 31, 41, support member 7' and the spacer 5 form a parallelogram. More than two projections may be provided on the bottom side of the spacer to make more than two joints between spacer and the cantilever leaf spring 41, thereby assuring more rigidity of the head against rotation. Due to the joints between spacer and gimbal aligned on the X—X axis, the head is capable of pitching and translational movement in Z-Y plane (shown in FIG. 8 in imaginary lines). The head carrying mechanism has sufficient rigidity against torsion about longitudinal axis of the cantilever.

Although the present invention has been described in terms of the presently preferred embodiments, it is to be understood that such disclosure is not to be interpreted as limiting. Various alterations and modifications will no doubt become apparent to those skilled in the art after having read the disclosure. Accordingly, it is intended that the appended claims be interpreted as covering all alterations and modifications as fall within the true spirit and scope of the invention.

What is claimed is:

1. A supporting structure for a dual magnetic head for use with a disk drive system for a double sided flexible disk comprising:
   a. a first magnetic core head and a second magnetic core head, said first head being disposed on a first side of said flexible disk and said second head being disposed on a second side of said flexible disk;
   b. a first leaf spring gimbal for supporting said first magnetic core head, said first leaf spring gimbal allowing said first magnetic core head to pitch and to roll as well as to move normally to a data storage surface on said flexible disk;
   c. a second leaf spring gimbal for supporting said second magnetic core head, said second leaf spring gimbal allowing said second magnetic core head to pitch and to move normally to a data storage surface on said flexible disk; and
   d. a cantilever leaf spring connected to said second leaf spring gimbal, said cantilever leaf spring for preventing rolling of said second magnetic core head.

2. A supporting structure as set forth in claim 1, in which a fixed end of said cantilever is fixed at points spaced in radial direction with respect to said data storage surface, and a free end thereof is joined to a central portion of said second leaf spring gimbal at two non-slidable points.

3. A supporting structure as set forth in claim 1, in which one end of said cantilever leaf spring is fixed and the other end is connected to a central portion of said second leaf spring gimbal by means of a spacer, a bottom end of said spacer is joined in at one non-slidable joint with said cantilever leaf spring and an upper end of said spacer is joined at two non-slidable points to said second leaf spring gimbal.

4. A supporting structure as set forth in claims 2 or 3, in which said non-slidable points comprise a plurality of slots provided on said second leaf spring gimbal and aligned in a radial line with respect to said data storage surface, and a plurality of tapered projections are inserted into said slots.

5. A supporting structure as set forth in claim 3, in which said second leaf spring gimbal, said cantilever leaf spring and said spacer between them are assembled into a unit to be mounted on a carriage arm.

6. A supporting structure for a dual magnetic head for use with a disk drive system for a double sided flexible disk comprising:
 a. a first magnetic core head and a second magnetic core head, said first magnetic core head disposed on a first side of said flexible disk and said second magnetic head disposed on a second side of said flexible disk;
 b. a first leaf spring gimbal for supporting said first magnetic core head, said first leaf spring gimbal allowing said first magnetic core head to pitch and to roll as well as to move normally to a data storage surface on said flexible disk;
 c. a second leaf spring gimbal for supporting said second magnetic core head, said second leaf spring gimbal allowing said second magnetic core head to pitch and to move normally to a data storage surface on said flexible disk;
 d. a back-up leaf spring gimbal for supporting said second magnetic core head and said second leaf spring gimbal for preventing rolling of said second magnetic core head; and
 e. a spacer for connecting said back-up leaf spring gimbal to said second leaf spring gimbal, a bottom end of said spacer is joined in at one non-slidable joint with said back-up leaf spring gimbal and an upper end of said spacer is joined in at two non-slidable points to said second leaf spring gimbal.

7. A supporting structure as set forth in claim 6, in which said non-slidable points comprise a plurality of slots provided on said second leaf spring gimbal and aligned in a radial line with respect to said data storage surface, and a plurality of tapered projections are inserted into said slots.

8. A supporting structure as set forth in claim 6, in which said second leaf spring gimbal, said back-up leaf spring gimbal and said spacer between them are assembled into a unit to be mounted on a carriage arm.

* * * * *